(12) United States Patent
Chen et al.

(10) Patent No.: US 10,072,790 B2
(45) Date of Patent: Sep. 11, 2018

(54) STEPLESS RAPID EXTENDABLE MULTIPOD WITH BUILT-IN POWER SUPPLY

(71) Applicant: Kaizhi Chen, Hong Kong (CN)

(72) Inventors: Kaizhi Chen, Guangzhou (CN); Glenn Mankit Tse, Humble, TX (US); Guohua Gao, Guangzhou (CN); Yongsen Huang, Guangzhou (CN); Xingchao Li, Guangzhou (CN)

(73) Assignee: Kaizhi Chen (CN)

( * ) Notice: Subject to any disclaimer, the term of this patent is extended or adjusted under 35 U.S.C. 154(b) by 399 days.

(21) Appl. No.: 14/857,806

(22) Filed: Sep. 17, 2015

(65) Prior Publication Data

US 2016/0084431 A1    Mar. 24, 2016

Related U.S. Application Data

(60) Provisional application No. 62/053,757, filed on Sep. 22, 2014.

(30) Foreign Application Priority Data

Jan. 13, 2015  (CN) .......................... 2015 1 0016842

(51) Int. Cl.
*H02J 1/10* (2006.01)
*F16M 11/28* (2006.01)
(Continued)

(52) U.S. Cl.
CPC .......... *F16M 11/28* (2013.01); *F16M 11/041* (2013.01); *F16M 11/34* (2013.01); *F16M 11/42* (2013.01)

(58) Field of Classification Search
CPC ...... F16M 11/28; F16M 11/34; F16M 11/041; F16M 11/42
(Continued)

(56) References Cited

U.S. PATENT DOCUMENTS

| 1,894,695 A | * | 1/1933 | Ley | ........................ | F16M 11/10 |
| | | | | | 248/171 |
| 5,980,124 A | * | 11/1999 | Bernardi | ................ | F16M 11/18 |
| | | | | | 396/428 |

(Continued)

FOREIGN PATENT DOCUMENTS

| CN | 104019095 A | 9/2014 |
| CN | 204041655 U | 12/2014 |

*Primary Examiner* — Richard Tan
(74) *Attorney, Agent, or Firm* — Law Offices of Albert Wai-Kit Chan, PLLC

(57) ABSTRACT

This invention provides an extendable multipod for mounting an apparatus, comprising: a) an apparatus mount that allows rapid mounting and dismounting of an apparatus, wherein the apparatus mount is attached to one end of an extendable device; b) an extendable device comprising a plurality of tubular poles which are mounted so as to be telescopically and axially slidable relative to each other between an extended position and a retracted position, and the extendable device is attached to a supporting element; and c) a supporting element comprising a plurality of legs that are connected to a divaricating plate, wherein the extendable device is inserted through the divaricating plate to affix on a leg connector, and the leg connector is connected to the plurality of legs by a plurality of braces. Furthermore, the extendable multipod comprises a built-in power supply.

16 Claims, 23 Drawing Sheets

(51) Int. Cl.
*F16M 11/04* (2006.01)
*F16M 11/42* (2006.01)
*F16M 11/34* (2006.01)

(58) Field of Classification Search
USPC .......................................................... 307/43
See application file for complete search history.

(56) References Cited

U.S. PATENT DOCUMENTS

| | | |
|---|---|---|
| 6,454,228 B1 | 9/2002 | Bosnakovic |
| 6,902,294 B2 | 6/2005 | Wright |
| 7,035,715 B1 * | 4/2006 | Burkhead ............... C02F 1/687 |
| | | 700/239 |
| 2007/0235604 A1 * | 10/2007 | Speggiorin ............ F16M 11/32 |
| | | 248/177.1 |
| 2012/0181979 A1 | 7/2012 | Hudspeth et al. |
| 2014/0054427 A1 * | 2/2014 | Garceau .................. B60D 1/66 |
| | | 248/157 |

* cited by examiner

STEPLESS RAPID EXTENDABLE MULTIPOD WITH BUILT-IN POWER SUPPLY

The application claims benefit of U.S. Ser. No. 62/053,757, filed Sep. 22, 2014 and Chinese Application No. 201510016842.0, filed Jan. 13, 2015. The content of the preceding applications are hereby incorporated by their entireties by reference into this application. Throughout this application, various publications are referenced. Disclosures of these publications in their entireties are hereby incorporated by reference into this application in order to more fully describe the state of the art to which this invention pertains.

FIELD OF INVENTION

This invention relates generally to a multipod with stepless extendable device and built-in power supply.

BACKGROUND OF INVENTION

Tripods are usually used to support apparatus to work at certain height. In the market today, the tripods for lights, telescopes, cameras, camcorders and microphones usually include an extendable pole set of two or more poles or telescopic legs to change height. Most extendable devices use off-center handles to tighten or loosen poles. Locking down the extension poles in place would use wing screws, bolts or pins. Lights, telescopes, cameras, camcorders and sound equipment are tightened to a tripod using traditional UNC ¼"-20 screws. These traditional tripod devices have several drawbacks such as: lot of parts, complicated assembly, high production cost, extending and locking down slowly. In addition, these tripods are used for a single purpose, just to support apparatus. If a piece of apparatus requires external power in outdoor environment where power source is unavailable, external battery will be needed. Batteries are stored inside the storage compartment underneath a tripod or the battery is hanged below the center extendable pole (as described in U.S. Pat. No. 6,454,228 B1). These approaches have limited power capacity because a tripod has limited storage space. Furthermore, the battery cannot charge and discharge power at the same time (as described in US 2012/0181979 A1). Wiring harness is cumbersome because attaching batteries below the center pole would require running wires from the battery below to the tripod head above (as described in U.S. Pat. No. 6,902,294 B2). All these drawbacks limit the portability of a tripod. Some tripods for the sake of portability are made with light weight material. This will reduce loading limit of the tripod. A tripod can tip over easily on uneven grounds such as dirt or grass land. Tipping over will also tip and break the supported apparatus.

In order to resolve the foresaid issues, there is a need for a type of portable multipod which will mount and dismount apparatus quickly, extend rapidly and steplessly, and supply power with built-in batteries.

SUMMARY OF INVENTION

In one embodiment, the multipod described in this invention includes a stepless extendable multipod supporting device, a rapid apparatus mount (RAM) and a built-in power supply system. The multipod comprises a plurality of legs, for example, two legs as a bipod, three legs as a tripod, or four legs as a quadpod. The number of legs is chosen according to the need of the actual applications. The multipod is suitable for many situations such as outdoor activities and all kinds of commercial industrial applications as well as home use and travel use. In one embodiment, it is suitable for uses in rescue missions, fire-fighting, emergency and anti-terrorist operations.

In one embodiment, the top of the multipod supporting device is affixed with an apparatus mount adaptor. An apparatus can be mounted directly on the apparatus mount adaptor. Alternatively, a rapid apparatus mount (RAM) is first mounted on the apparatus mount adaptor. Then the apparatus is mounted on the RAM.

In one embodiment, the stepless extendable multipod supporting device includes a stepless extendable device (SED) and a supporting element. One end of the SED is affixed to the supporting element, whereas the other end of the SED is affixed with an apparatus mount adaptor which can mount an apparatus or a RAM.

In one embodiment, the stepless extendable device includes an apparatus mount adaptor, an extendable pole set, pole plugs, pole locks, guiding and positioning rings (GAP rings) and unidirectional safety valves (UDS valves). Pole plugs are inserted inside the pole set and affixed at the two ends of the pole set. Pole locks are used to lock down the poles of the extendable pole set. An extendable pole set includes at least two poles of different diameters. In the order from largest to smallest diameter, a larger pole sleeves a smaller pole. A pole lock is placed on the outside of every pole of smaller diameters. A GAP ring is placed between every pair of inner and outer poles to guide and position each pole. The pole lock utilizes an eccentric axis to force an axial shift between an outer and inner pole to form a mechanical lock. A pole lock sleeving an inner pole can move up and down freely, thus capable of creating a lock at various heights.

A UDS valve of said stepless extendable device is installed at the lower end of every inner pole. When an inner pole drops down with a heavy object on top, the rapid falling motion will compress the air inside the outer pole. The faster the falling, the larger is the reaction force to slow down the falling. Thus, a user will not be harmed by the rapid falling of the extendable poles.

In one embodiment, the supporting element includes at least two legs, a corresponding number of leg braces, a leg connector and a divaricating plate. One end of each leg is hinged on the divaricating plate. In one embodiment, each leg has a hinged foot which can be folded up. Folding down the hinged feet and pinning them into the ground will stabilize the multipod for operation on dirt ground or grass. One or several of the legs of the multipod may be telescopic and extend and lock steplessly. This arrangement guarantees the mounted apparatus to maintain leveled operation even though the ground is not horizontally leveled. One end of each leg brace is hinged at the leg connector. The other end of the leg brace sleeves and slidably connects to a leg. The center of the divaricating plate has a hole for the stepless extendable device (SED) to pass through, thereby allowing one end of the SED to be affixed to the leg connector.

In one embodiment, the power supply system includes a power supply control (PSC) and high energy power supplies hidden inside the legs and/or the SED to supply power to the apparatus mounted on the multipod. In one embodiment, a power supply is inserted into each leg and the SED. The PSC is installed inside the divaricating plate of the supporting element. Each power supply is connected electrically to the PSC. The PSC controls the discharging order of the power supplies. In one embodiment, the PSC provides a charging socket and a discharging socket for apparatus and charger connections. The PSC also has a power supply status indicator. When a power supply is exhausted, the PSC will discharge from the next power supply automatically and so on. By placing the power supplies inside the legs and/or SED, the weight of the power supplies assures a low center of gravity and the stability of the multipod.

In one embodiment, the optional rapid apparatus mount (RAM) includes a fixed locking base, a rotatable mounting base and a rotation axle. The rotatable mounting base is connected to the fixed locking base through the rotation axle. The rotatable mounting base has mounting holes which correspond to the stud feet at the bottom of an apparatus to be mounted. The corresponding mounting holes on the fixed locking base have an insertion portion and a locking portion. The insertion portions can be aligned concentrically with the mounting holes of the rotatable mounting base. The locking portions are located on the rotating loci of the mounting holes of the rotatable mounting base. When mounting an apparatus, first align concentrically the mounting holes on the rotatable mounting base to the insertion portions of the mounting holes on the fixed locking base. Then insert the stud feet of the apparatus into the aligned mounting holes. After rotating the rotatable mounting base, the stud feet will be shifted into the locking portions of the mounting holes on the fixed locking base. The apparatus is then locked.

The RAM can be affixed on a multipod or any suitable place. An apparatus is mounted on the RAM when needed. In another embodiment, the RAM can also use a magnetic installation method. First affix a special magnetic device under the RAM. An apparatus can be locked and left on a RAM. During use, the apparatus and RAM as a whole are placed on any ferrous surface which the magnetic device attracts magnetically.

The advantages of the present invention include fewer parts, simple structure, sturdy support, easy mounting and dismounting of apparatus.

NUMERALS USED IN DRAWINGS

- 1 Rapid Apparatus Mount (RAM)
- 11 Rotatable Mounting Base
- 12 Fixed Locking Base
- 13 Rotation Axle Bolt
- 14 Round Mounting Hole of Rotatable Mounting Base
- 15 Gourd Shaped Mounting Hole of Fixed Locking Base
- 151 Insertion Portion of Gourd Shaped Mounting Hole
- 152 Locking Portion of Gourd Shaped Mounting Hole
- 16 Adjusting Groove
- 17 Locking Bolt
- 18 Rivet
- 19 Lever
- 192 Magnetic Mount Device
- 194 Stud Foot
- 195 Countersunk Head Screw
- 196 Magnet
- 197 Soft Plastic Protector Cup
- 2 Stepless Extendable Device (SED)
- 21 Extendable Pole Set
- 211 Small Pole
- 212 Large Pole
- 22 Pole Plug
- 23 Pole Lock
- 24 Guiding And Positioning Ring (GAP Ring)
- 25 Extension Control Motor
- 26 Unidirectional Safety Valve (UDS Valve)
- 27 Extension Control Switch
- 28 Drive screw
- 3 Multipod Supporting Element
- 31 Leg
- 311 Telescopic Leg With Stepless Extension and Lock
- 312 Multipod Mount Adaptor
- 32 Brace
- 33 Divaricating Plate
- 34 Leg Connector
- 35 Extendable Device Lock
- 36 Leg Lock
- 37 Power Supply
- 38 Apparatus Mount Adaptor
- 381 Discharging Socket -continued

| NUMERALS USED IN DRAWINGS |
| --- |
| 382 Charging Socket |
| 383 Power Supply Status Indicator |
| 39 Hinged Foot |
| 40 Hinged Caster |
| 42 Working Platform |
| 43 Foldable Arm |

DETAILED DESCRIPTION OF INVENTION

In the following description, several embodiments of the invention are described. For purposes of explanation, specific configurations and details are set forth in order to provide a thorough understanding of the embodiments. In addition, to the extent that orientations of the embodiments are described as "top", "bottom", "front", "back", "left", "right" and the like, these wordings are to aid the reader in understanding the embodiments and are not meant to be limiting physically. It is apparent to a person skilled in the art that the present invention may be practiced without specific details. The invention will be better understood by reference to the embodiments which follow, but those skilled in the art will readily appreciate that the specific embodiments are for illustrative purposes only and should not limit the scope of the invention which is defined by the claims which follow thereafter. It is to be noted that the transitional term "comprising" or "including", which is synonymous with "containing" or "characterized by", is inclusive or open-ended and does not exclude additional, unrecited elements or method steps.

Figure 1:
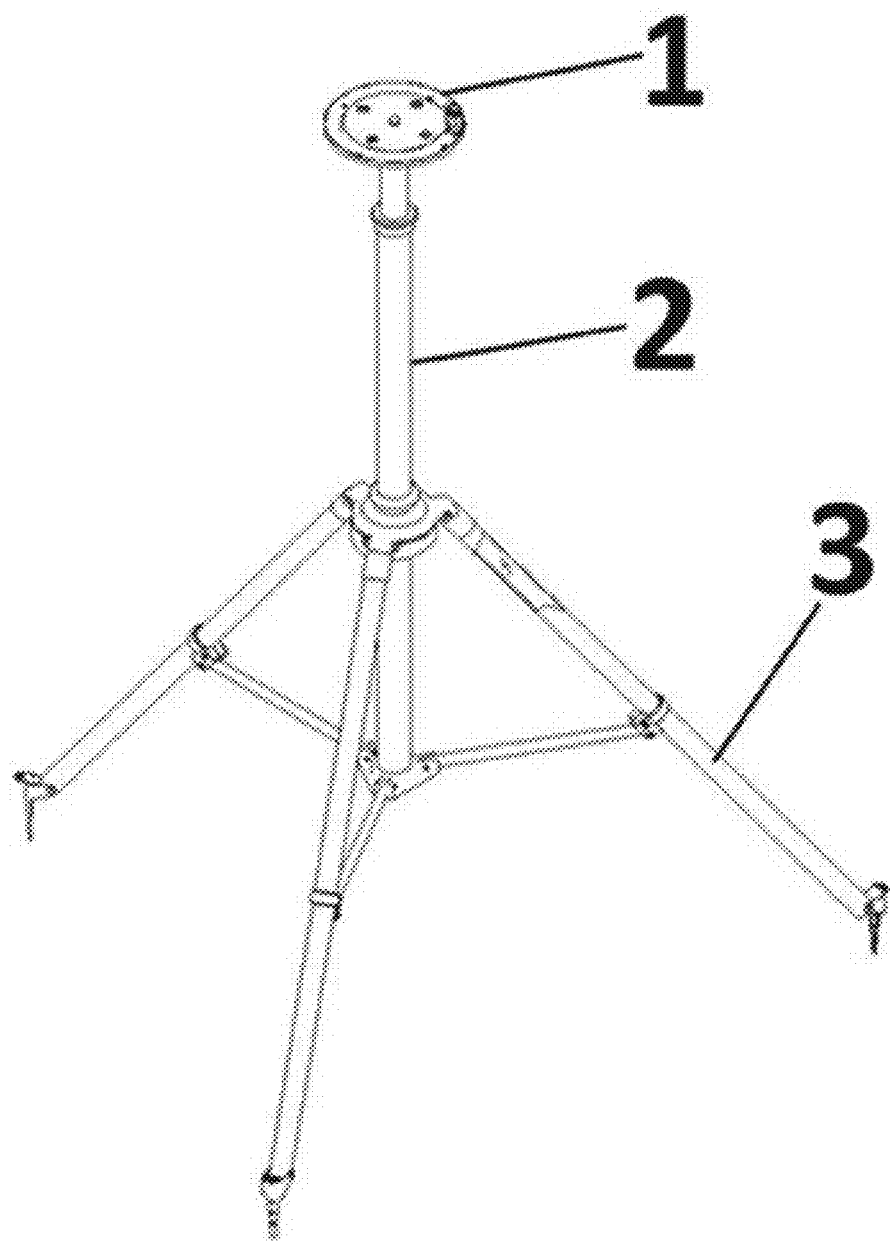
FIG. 1 is a three dimensional perspective view of a tripod in one embodiment of this invention.

In one embodiment as shown in FIG. 1, there is provided a tripod using this invention. As shown in FIG. 1, a rapid apparatus mount (RAM) 1, a stepless extendable device (SED) 2 and a multipod supporting element 3 with three legs together form an extendable tripod.

Figure 2:
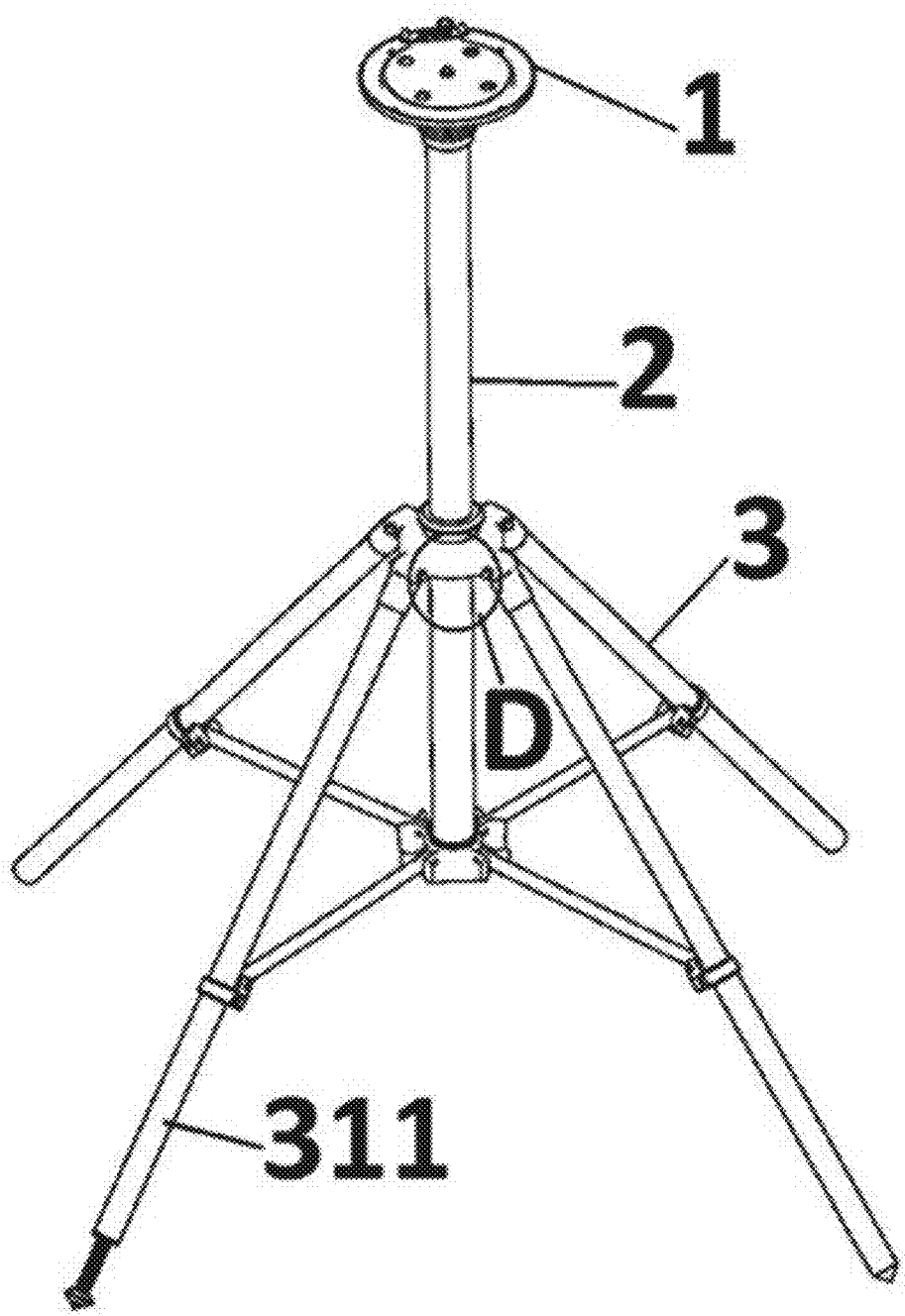
FIG. 2 is a three dimensional perspective view of a quadpod in one embodiment of this invention.

In one embodiment as shown in FIG. 2, there is provided a quadpod using this invention. A RAM 1, a SED 2 and a multipod supporting element 3 with four legs together form an extendable quadpod. As shown in FIG. 2, one of the legs of the quadpod is a telescopic leg 311 which can extend and lock steplessly for use at unleveled ground.

Figure 3:
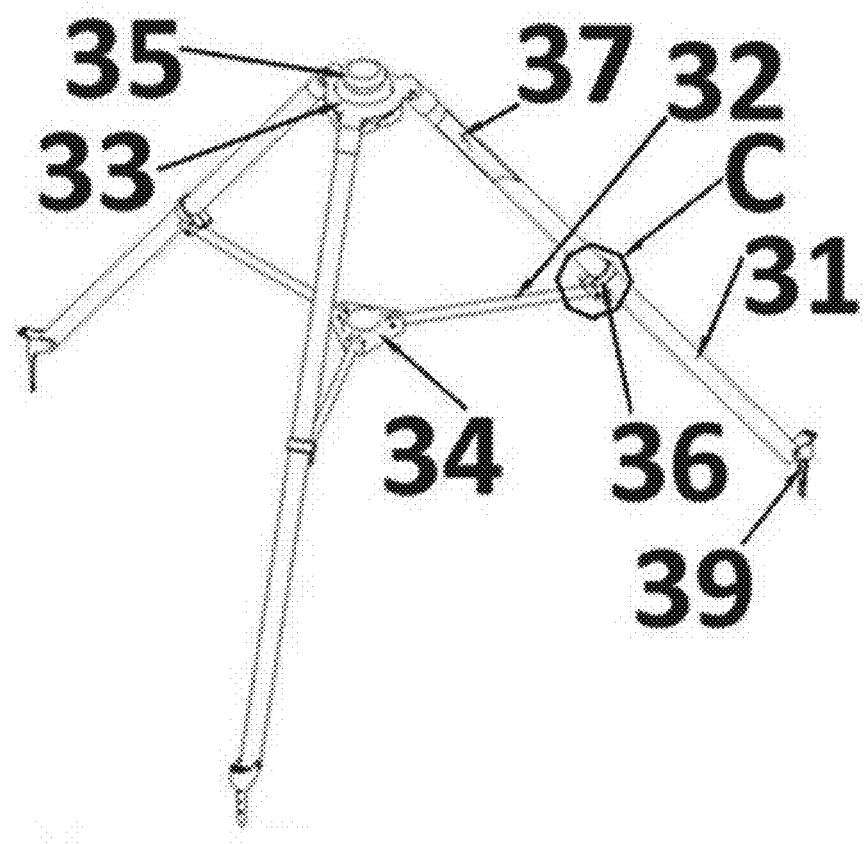
FIG. 3 is a three dimensional perspective view of a supporting element 3 of FIG. 1.

Further to the embodiments as shown in FIG. 1 and FIG. 2, there is provided a multipod supporting element which includes a number of legs 31, equivalent number of braces 32, a divaricating plate 33, a leg connector 34 and an extendable device lock 35 (FIG. 3). One end of a leg 31 is hinged on divaricating plate 33. One end of a brace 32 is hinged on leg connector 34 while the other end of the said brace 32 sleeves said leg 31 as a slidable connection. A hole at the center of the divaricating plate 33 allows the SED 2 to pass through and be affixed to the leg connector 34.

Figure 7:
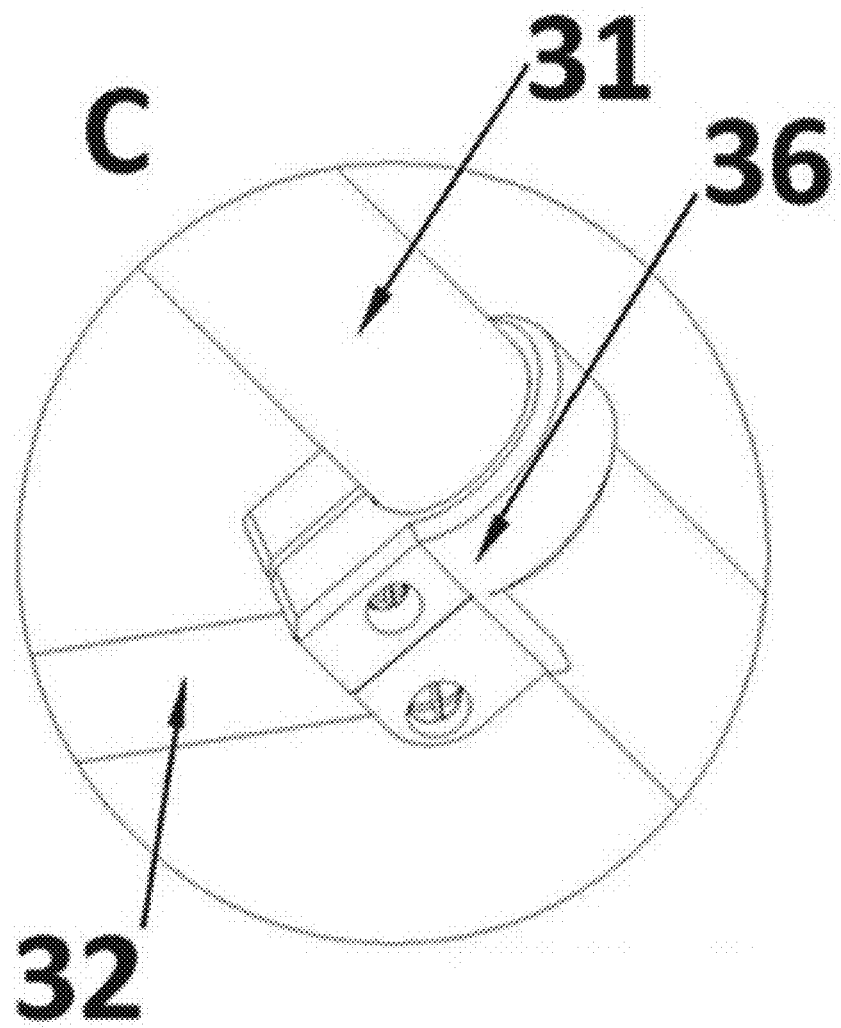
FIG. 7 shows an enlarged view at position C of FIG. 3.

Further to the embodiments as shown in FIG. 3, the multipod supporting element also includes leg locks 36 as shown in FIG. 7. The fixed end of the leg lock is hinged with a brace 32. A leg 31 passes through the hole of leg lock 36. Because of the reaction force asserted by braces 32, leg locks 36 will slide up and down along a leg 31, thereby allowing the multipod supporting element 3 to be opened or closed, respectively. The multipod demonstrates a stable supporting form of multiple legs when it is opened. The multipod is compact in packing size and easy to carry when it is closed. When closing the multipod supporting element 3, shift leg locks 36 down along legs 31 until the bottom of legs 31 are close together. When opening the multipod supporting element 3, leg locks 36 are slided upward along legs 31 because of the reaction force asserted by braces 32. When braces 32 and legs 31 are spread out to certain angle, the multipod supporting element 3 will stand on the ground. Then SED 2 can be raised to desired height according to the need. An apparatus can be mounted quickly on top of SED 2 for operation. The multipod can be opened quickly to support apparatus and closed easily to save on packing space.

In the embodiments as shown in FIG. 3, multipod supporting element 3 can house optional power supplies 37 inside legs 31 or inside SED 2. Power supplies 37 could be rechargeable batteries, single use dry batteries, single use hydrogen cells or any suitable power supply which can be hidden inside legs 31 or SED 2. In one embodiment, power supply control (PSC) is installed inside divaricating plate 33 and is connected electrically to power supplies 37. The PSC controls the discharge of power supplies 37 to satisfy the electricity requirement of the supported apparatus. Because all power supplies 37 and PSC are housed inside existing parts, no space is occupied outside the multipod supporting element 3. In one embodiment, a power supply is inserted inside each of legs 31 and SED 2. The discharging order is controlled by the PSC in sequence. When a power supply runs out of power, the PSC will discharge from the next available power supply, and so on. Because each leg 31 and SED 2 house a similar power supply 37, the weight of legs 31 and SED 2 is increased evenly. The increase of weight will increase the weight of multipod supporting element 3 with a low center of gravity. It will improve the stability of the multipod supporting element 3.

Figure 8:
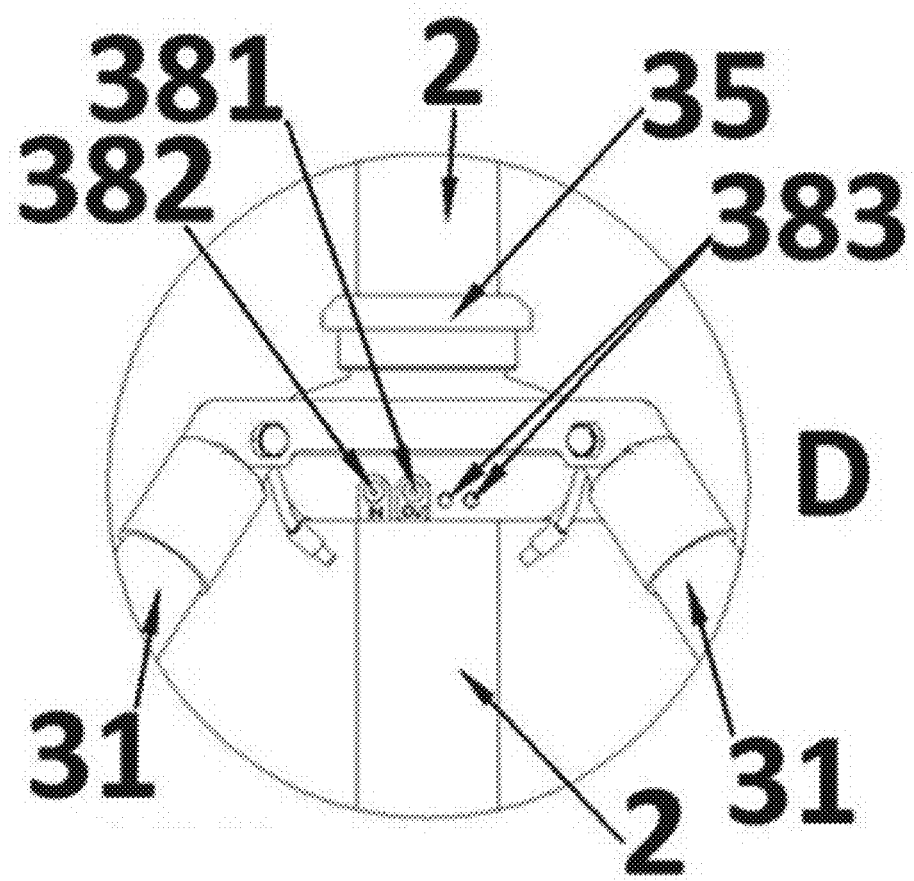
FIG. 8 shows enlarged view at position D of FIG. 2.

In an embodiment as shown in FIG. 8, the PSC includes power supply status indicator 383 and sockets for connecting apparatus and charger. Sockets include a discharging socket 381 and a charging socket 382. Discharging socket 381 is used by the PSC to supply electricity from power supplies 37 to apparatus needing power by connecting a compatible power cable from the apparatus to discharging socket 381. Charging socket 382 is used by the PSC to charge power supplies 37 in sequence if rechargeable batteries are inserted inside legs 31 and/or SED 2. The PSC can supply power to apparatus and charge batteries at the same time if external power source is available. It is unnecessary to remove rechargeable batteries from the multipod in order to charge a battery. Power supply status indicator 383 shows the power level of power supplies 37.

In an embodiment as shown in FIG. 3, each leg 31 has a hinged foot 39 near the bottom. The hinged foot 39 can be folded down to pin into the ground when the multipod is used in dirt or grass to assure safe operation of the multipod. In another embodiment, if the operating ground is unleveled and uneven, the length of the telescopic leg 311 can be extended or retracted and locked at appropriate length to assure safe operation of the apparatus on top of the multipod.

Figure 4:
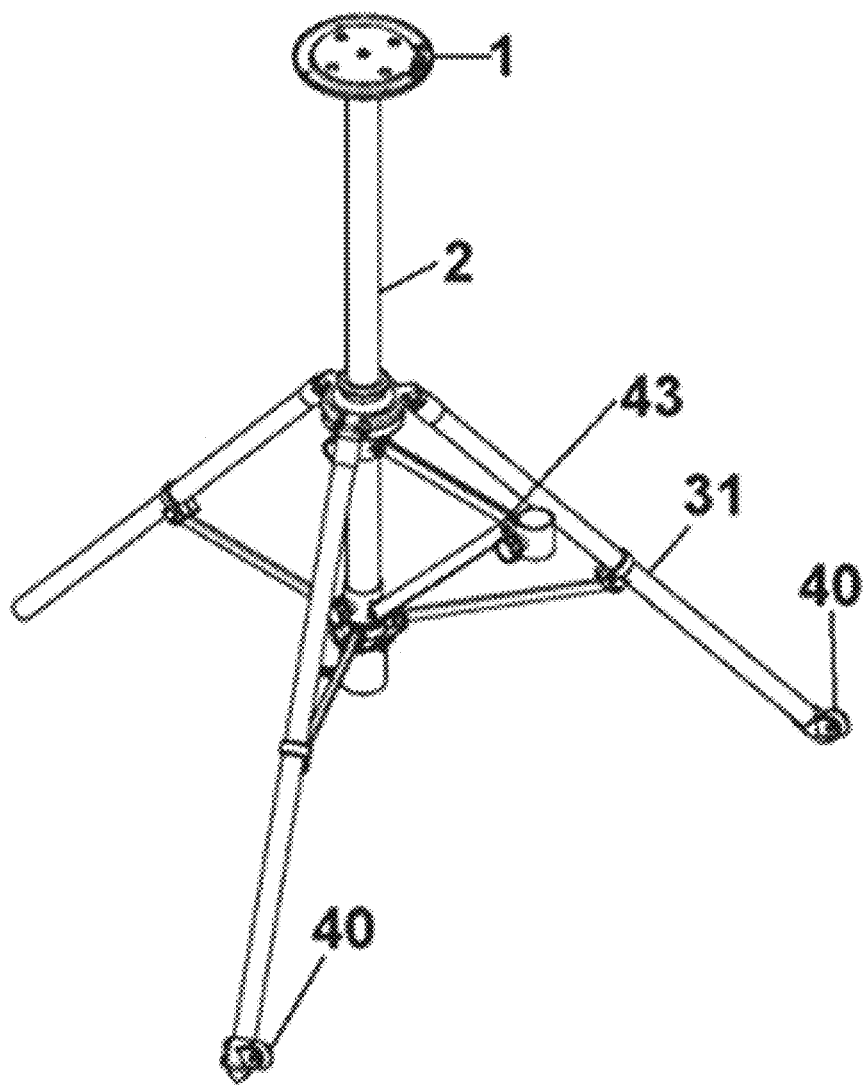
FIG. 4 shows a hinged caster 40 mounted on a leg 31 and a foldable arm 43 mounted on the multipod supporting element 3 of this multipod in one embodiment of this invention.
Figure 5:
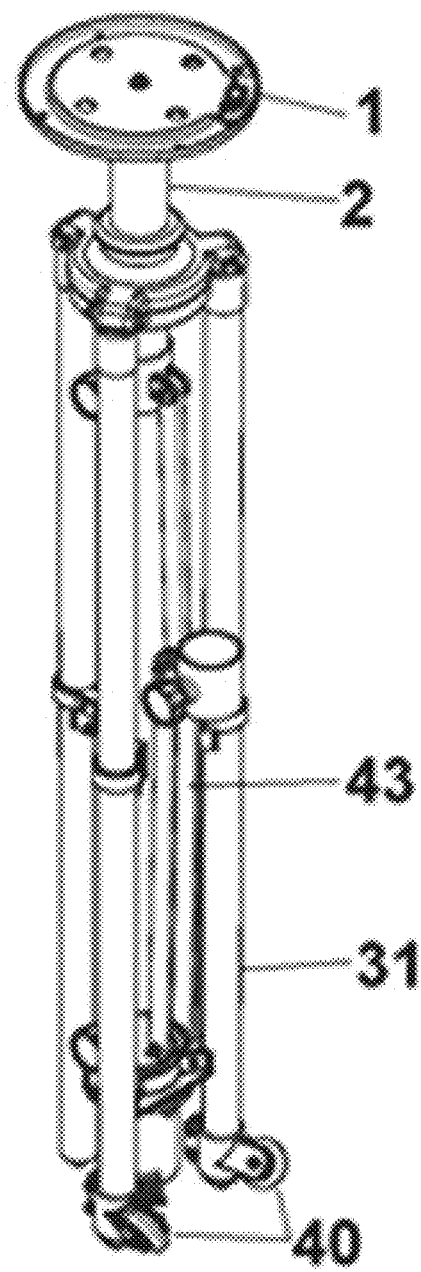
FIG. 5 shows when the multipod in one embodiment of this invention as shown in FIG. 4 is closed. Nothing is attached to the foldable arm 43.

In one embodiment, at least one of said legs 31 of the extendable multipod have one or more hinged casters 40 to facilitate sliding or moving of said extendable multipod as shown in FIG. 4. The hinged casters 40 are mounted near the bottom of the legs 31. When a multipod is closed for carrying, the hinged casters 40 can be folded down to allow easy towing of a multipod (FIG. 5). In another embodiment, there is a hinged caster 40 mounted near the bottom of each leg 31. When the multipod is used for operation which requires smooth sliding such as filming, the hinged casters 40 on all legs 31 are folded down. The multipod along with the apparatus mounted on top can slide around smoothly and easily.

Figure 6:
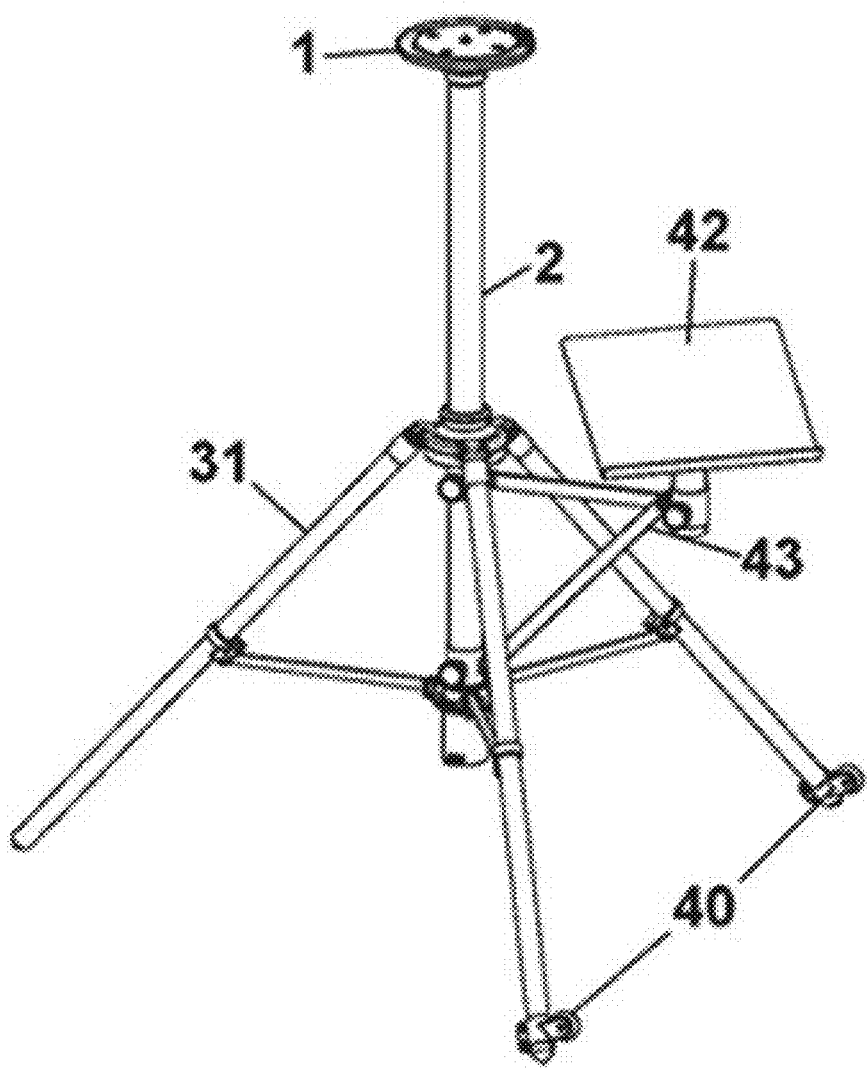
FIG. 6 shows a working platform 42 attached to a foldable arm 43 of this multipod in one embodiment of this invention.

In one embodiment, multipod supporting element also includes a working platform 42 (FIG. 6) or a basket is mounted at the end of a foldable arm 43. The foldable arm 43 can be folded up to the side of the SED 2 for stand-by (FIG. 5). The working platform 42 or the basket can be folded down when extra equipment needs to be used with the multipod during an operation. In one embodiment, a battery is placed in the basket. In another embodiment, a record book or an instruction manual is placed on the working platform 42.

In the embodiments as shown in FIG. 1 to FIG. 3, multipod supporting element also includes an extendable device lock 35 to lock SED 2 on the divaricating plate 33. Extendable device lock 35 is formed in a cone shape with an eccentric axis (FIG. 8). This axis of extendable device lock 35 is parallel and shifted horizontally from the axis of the hole in the center of the divaricating plate. The size of the axial shift is determined according to the weight of supporting load and the size of the SED 2. In one embodiment, the shift is between 0.5 to 2 mm. Extendable device lock 35 can safely position SED 2 inside the hole of divaricating plate 33. SED 2 would not sway because of any gap in the hole. The stability and sturdiness of the multipod supporting device are improved.

In the embodiments as shown in FIG. 1 to FIG. 3 and FIG. 9-13, the lower end of SED 2 is supported by the multipod supporting element 3. In one embodiment, SED 2 includes one or more extendable pole set 21, pole locks 23, pole plugs 22, guiding and positioning rings (GAP rings) 24, and unidirectional safety valves (UDS valves) 26 which are installed inside the poles of extendable pole set 21.

Figure 9:
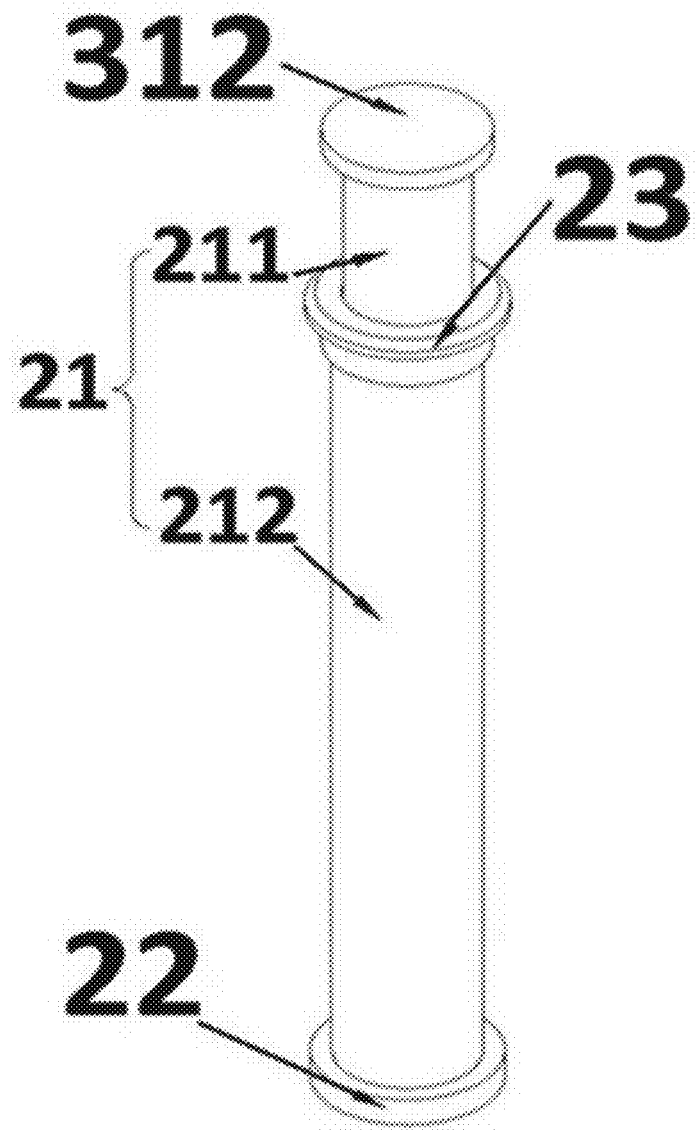
FIG. 9 is a three dimensional perspective view of a stepless extendable device (SED) 2 in one embodiment of this invention.
Figure 10:
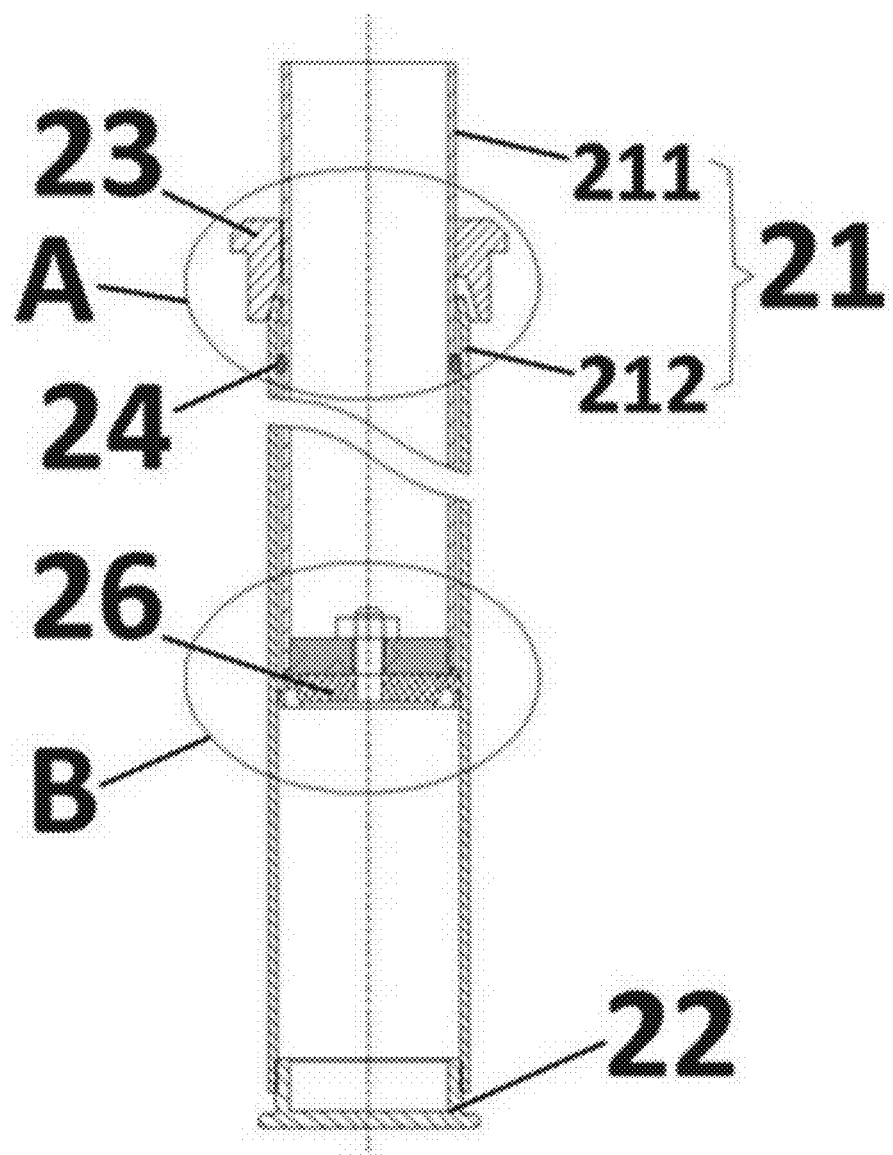
FIG. 10 is a cross-sectional view of a SED 2 in one embodiment of this invention.

In an embodiment as in FIG. 9 and FIG. 10, extendable pole set 21 includes at least two poles of different diameters. In the order from largest to smallest diameter, a larger pole sleeves a smaller pole. USD valves 26 are inserted and installed inside the lower end of extendable pole set 21. In this embodiment, an extendable pole set 21 has two poles, namely, small pole 211 and large pole 212. Large pole 212 sleeves small pole 211. Pole plugs include small pole plug and large pole plug.

Small pole plug is inserted and installed inside the top end of small pole 211. Large pole plug is inserted and installed inside the bottom end of large pole 212.

Figure 11:
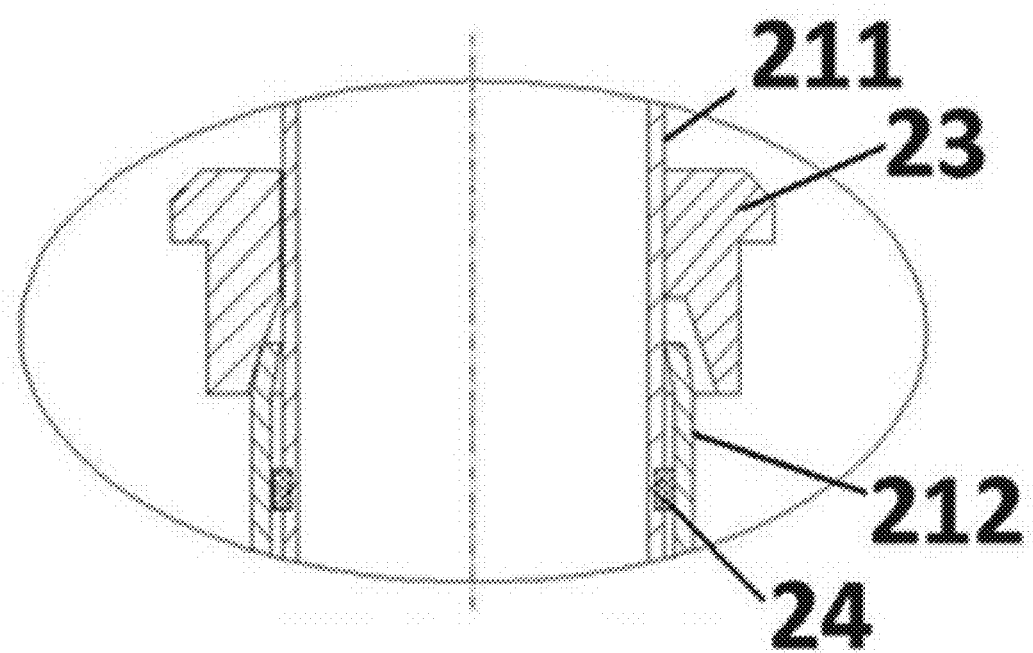
FIG. 11 shows an enlarged view at position A of FIG. 10.

In the embodiments as shown in FIG. 9 to FIG. 11, pole locks 23 are used to lock poles of extendable pole set 21 in place. Pole lock 23 is formed in a cone shape with an eccentric axis. This axis of pole lock 23 is parallel and shifted horizontally from the axis of a pole. The size of the axial shift is determined according to the weight of the supporting load and the size of the pole. In one embodiment, the shift is between 0.5 to 2 mm. In an embodiment, pole lock 23 causes an axial shift between a large pole 212 and a small pole 211 to form a mechanical lock. Pole lock 23 sleeving small pole 211 can move up and down freely. When small pole 211 is raised or dropped to any desired height, pole lock 23 is dropped to sleeve large pole 212. Small pole 211 is locked and cannot be moved. Simply raise pole lock 23 slightly to unlock small pole 211 and small pole 211 is free to move up or down.

Figure 13:
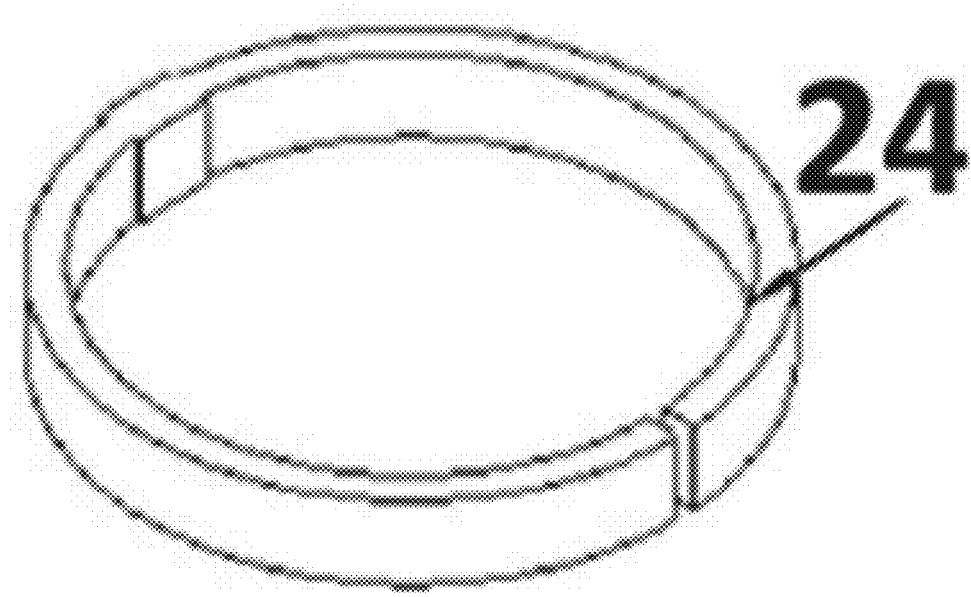
FIG. 13 is a three dimensional perspective view of a guiding and positioning ring (GAP ring) 24 used inside the extendable pole set 21 in one embodiment of this invention.

In the embodiments as shown in FIG. 10, FIG. 11 and FIG. 13, a GAP ring 24 is installed between large pole 212 and small pole 211. Gap ring 24 guides the relative movement of the poles and thus positions the poles relatively. Small pole 211 cannot sway inside large pole 212. Gap ring 24 also stop small pole 211 from completely coming out from large pole 212 while moving upward.

Figure 12:
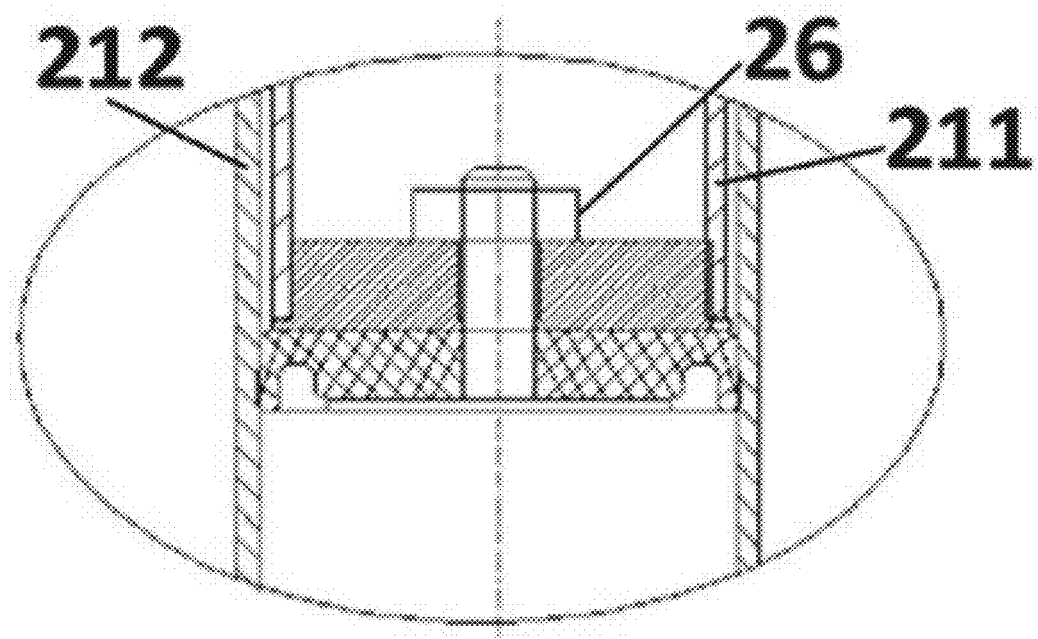
FIG. 12 shows an enlarged view at position B of FIG. 10.

In an embodiment as in FIG. 10 and FIG. 12, the lower portion of UDS valve 26 is cone shape. The middle of UDS valve 26 tightly fills the space inside a pole. UDS valve 26 is installed at the lower end of pole 211 to seal the pole. When small pole 211 rapidly falls down, the air inside large pole 212 is compressed and creates an upward reaction force. The reaction force will prevent the rapid falling of small pole 211 and thus protects a user from being hurt by the rapid fall of small pole 211. In one embodiment, UDS valve 26 is made of soft rubber and polymer material with excellent elasticity. It provides enough buffer time for small pole 211 to fall. The safety of SED 2 is enhanced.

Figure 14A:
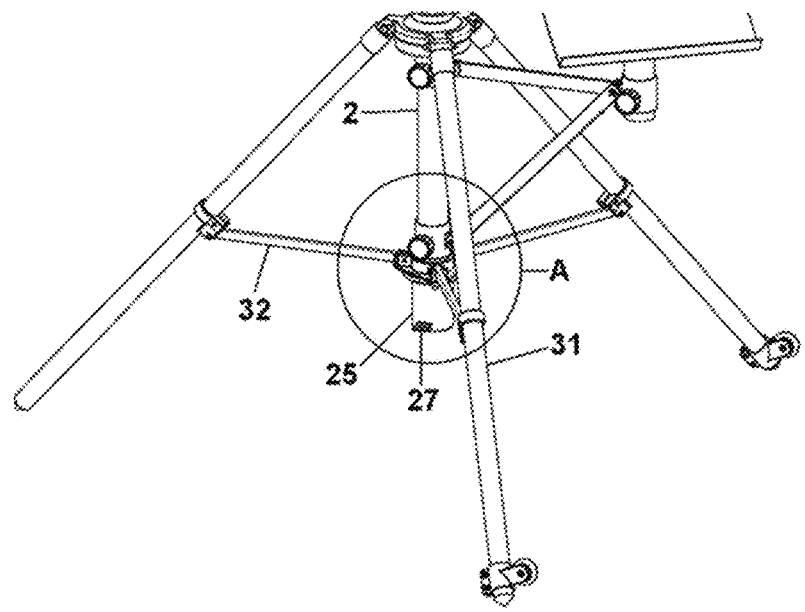
FIG. 14(a) shows an extension control motor 25 of this multipod in one embodiment of this invention.
Figure 14B:
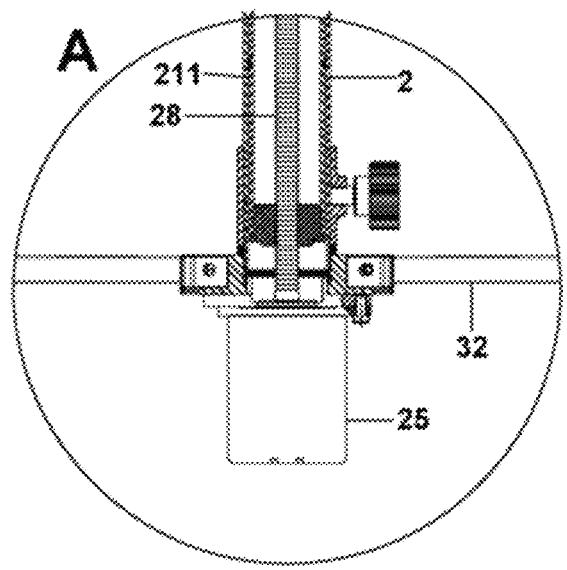
FIG. 14(b) shows a cross-sectional view at position A of FIG. 14(a).

In one embodiment, SED 2 comprises a motorized device for controlling the extension as shown in FIG. 14(*a*). Said motorized device comprises an extension control motor 25 and a drive screw 28 as shown in FIG. 14(*b*). The drive screw 28 is sleeved by the smallest extension pole 211 of said SED 2. The inner surface of said smallest extension pole 211 has threads to couple with the threads of the drive screw 28. The extension control motor 25 can be controlled to turn clockwise or counterclockwise by using the extension control switches 27 on the side of the motorized device. In a further embodiment, said extension control motor 25 is controlled by wired or wireless remote control. As the extension control motor 25 is turned counterclockwise, the drive screw 28 will carry the smallest extension pole 211 into an upward movement which will extend the SED 2. As the extension control motor 25 is turned clockwise, the drive screw 28 will carry the smallest extension pole 211 into a downward movement which will retract the SED 2. The extension control motor 25 is stopped when a desirable height is reached. A small pole plug is inserted and installed inside the top end of smallest pole 211 to limit the highest extension and to prevent the smallest extension pole 211 from coming off the top of the SED 2.

Figure 15:
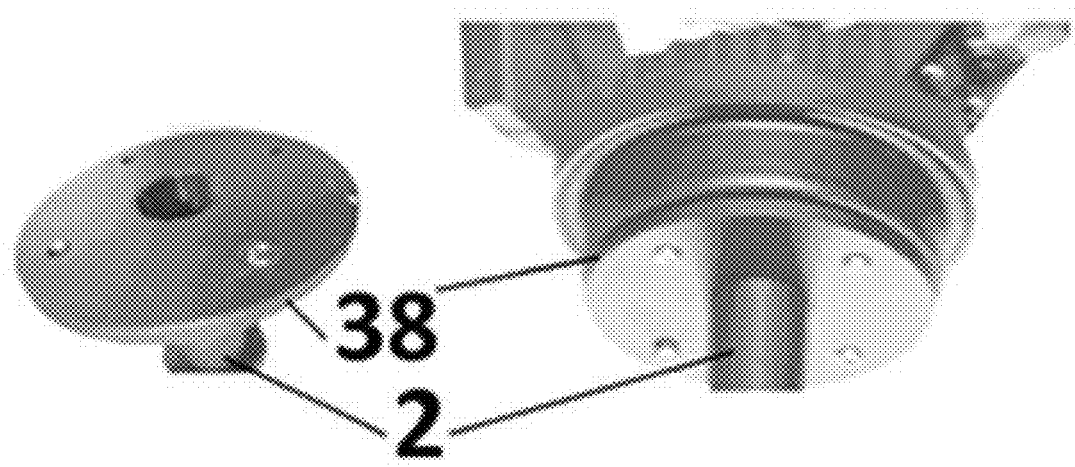
FIG. 15 shows a photo of an apparatus mount adaptor 38 attached to a supporting element 3 in one embodiment of this invention.

In an embodiment as in FIG. 9, a multipod mount adaptor 312 is installed on top of small pole 211. The outside perimeter of multipod mount adaptor 312 has threads. An apparatus mount adaptor 38 or any mounting plate having a matching threaded hole can be screwed tightly onto the multipod mount adaptor 312 (see FIG. 15). An apparatus can be tightened on the apparatus mount adaptor 38 or mounting plate using suitable screws or bolts. If the mounting plate is ferrous, an apparatus with magnetic adapter can magnetically attach onto the mounting plate. In another embodiment, RAM 1 can be attached to a ferrous surface by magnetic device.

In an embodiment as in FIG. 2, there is provided a RAM 1 which is mounted on an apparatus mount adaptor 38 on top of a SED 2.

Figure 16:
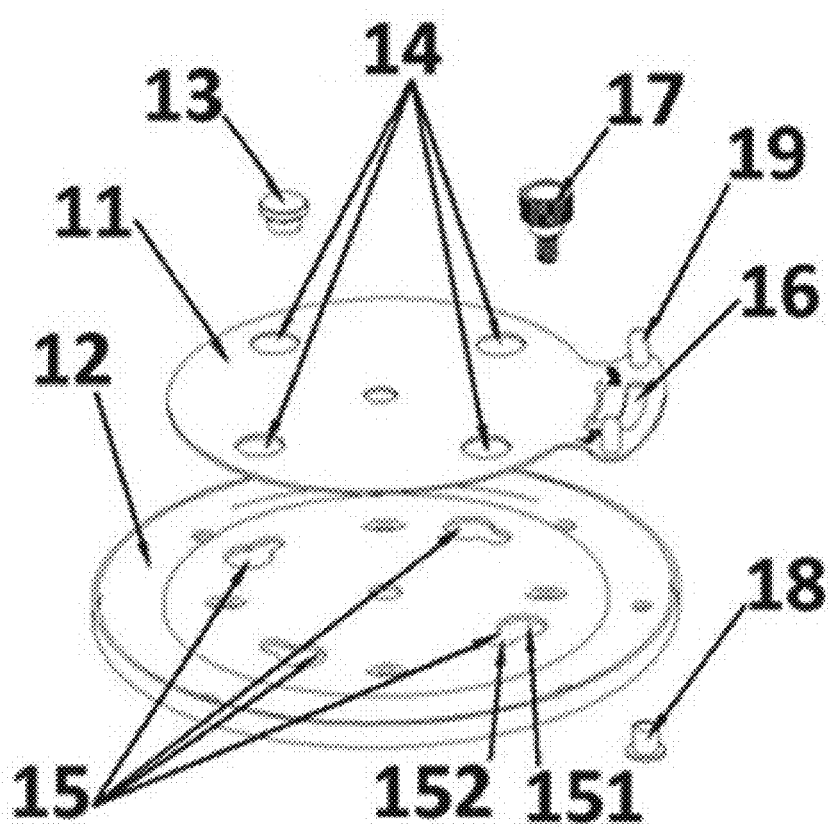
FIG. 16 shows an exploded view of a rapid apparatus mount (RAM) 1 in one embodiment of this invention.

In an embodiment as in FIG. 16, the RAM 1 includes a rotatable mounting base 11, a fixed locking base 12, a rotation axle bolt 13, a locking bolt 17 and a lever 19. The advantage of said RAM 1 is that it is not necessary to use any assisting tool to mount or dismount apparatus. Rotatable mounting base 11 has a rotatable connection with fixed locking base 12 through rotation axle bolt 13.

Figure 19:
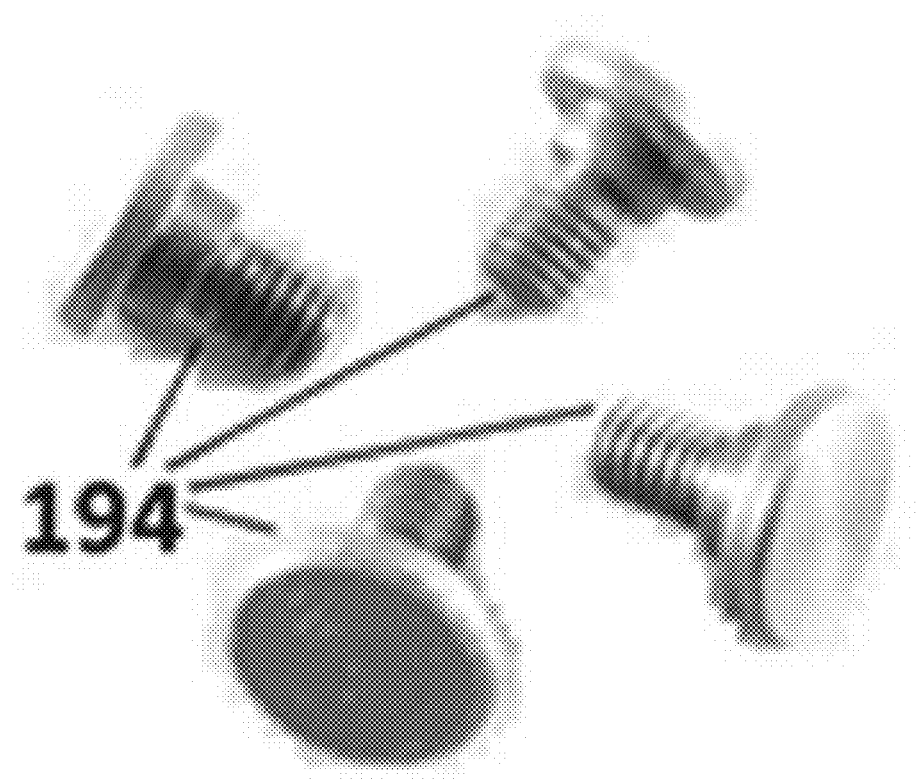
FIG. 19 shows a photo of actual matching stud feet 194 of an apparatus in one embodiment of this invention.
Figure 20:
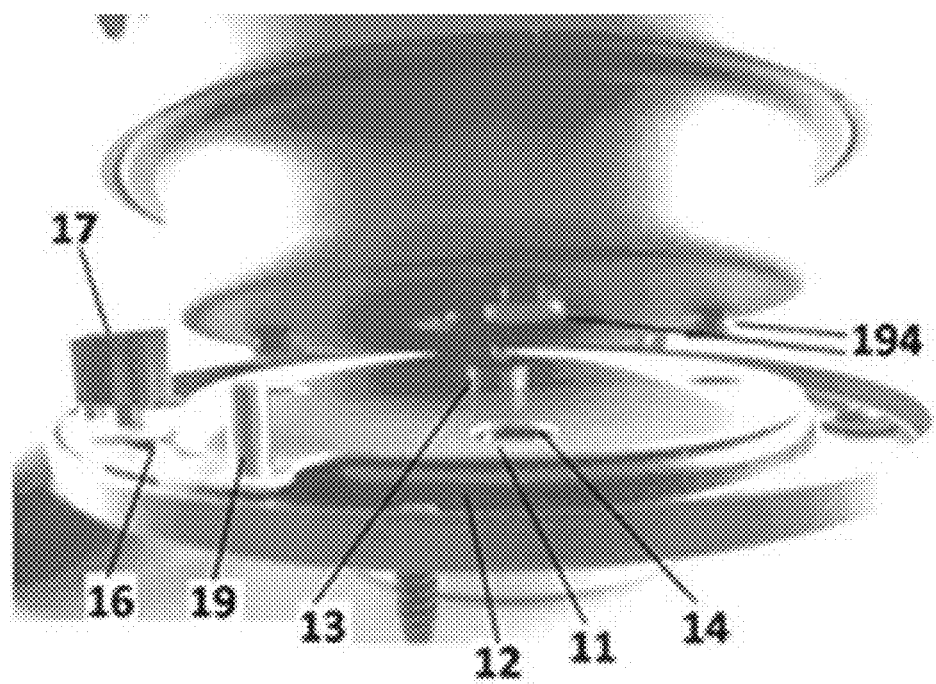
FIG. 20 is a photo showing an apparatus mounted onto a RAM 1 in one embodiment of this invention.

In an embodiment as in FIG. 19 and FIG. 20, a set of stud feet 194 have been installed at the bottom of an apparatus. Stud foot has a large stud head and a shank. The diameter of stud head is larger than the diameter of the shank.

In the embodiments as shown in FIG. 17 to FIG. 20, rotatable mounting base 11 has round mounting holes 14 at positions corresponding to the stud feet 194 located beneath the apparatus to be mounted. Fixed locking base 12 has gourd-shaped mounting holes 15 at positions corresponding to the round mounting holes 14 on rotation mounting base 11. In one embodiment, the gourd-shaped mounting hole 15 includes insertion portions 151 and locking portions 152. The diameter of insert portion 151 is similar to the diameter of round mounting hole 14 and the diameter of the stud head of stud foot 194. The holes are aligned concentrically. The diameter of locking portion 152 of the gourd-shaped mounting hole 15 is similar to the diameter of the shank of stud foot 194. Locking portions 152 of the gourd-shaped mounting holes 15 are installed on the rotating loci of the corresponding round mounting holes 14. Stud feet 194 attached to the apparatus to be mounted are inserted through the round mounting holes 14 into the mounting holes 15 at the insertion portions 151 which is the side of mounting hole 15 with greater diameter. After rotating the rotatable mounting base 11, stud feet 194 will be carried into the locking portion 152 of the mounting holes 15 on fixed locking base 12. Locking portion 152 is the side of hole 15 with smaller diameter.

Figure 17:
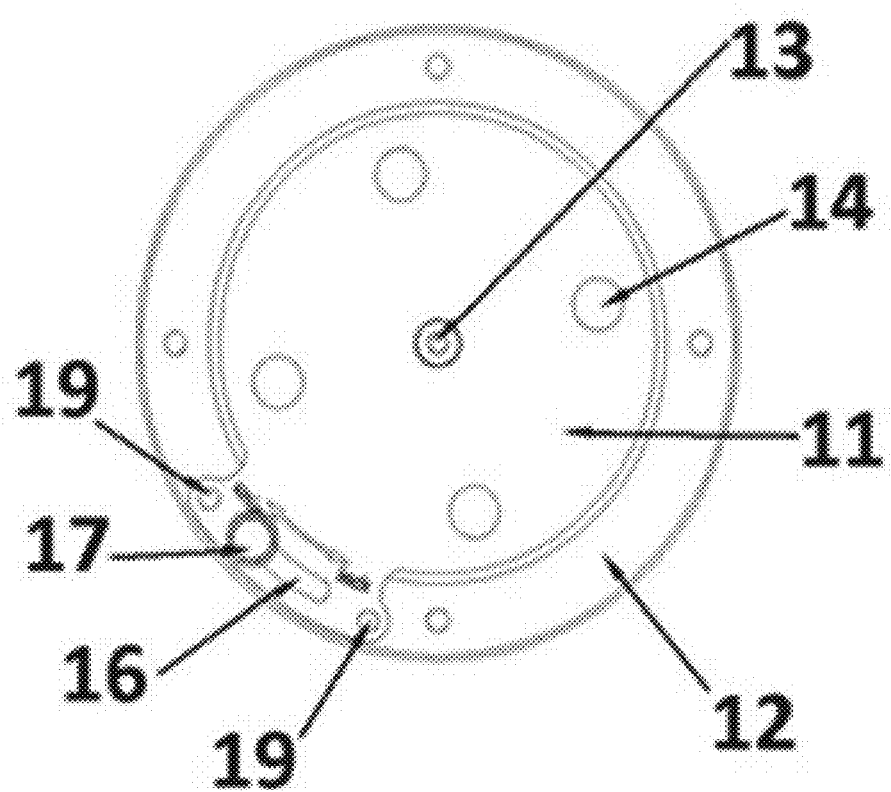
FIG. 17 shows a schematic view of a RAM 1 in unlocked position in one embodiment of this invention.
Figure 18:
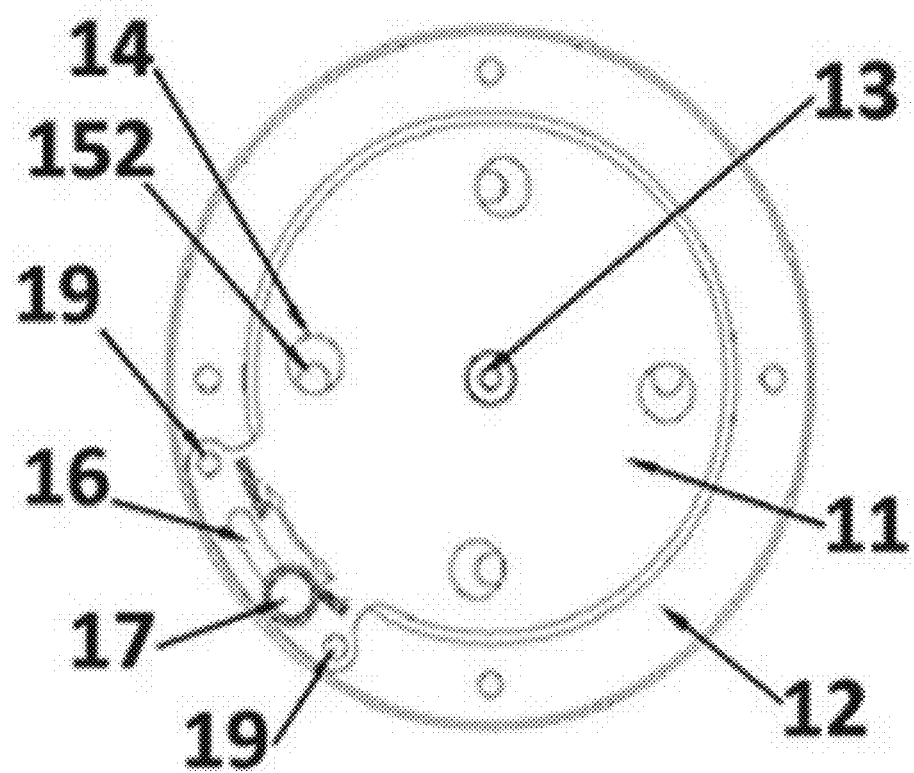
FIG. 18 shows a schematic view of a RAM 1 in locked position in one embodiment of this invention.

In the embodiments as shown in FIG. 16 to FIG. 18, there is a locking mechanism to lock down rotatable mounting base 11 on RAM 1. The locking device includes an adjusting groove 16 and a locking bolt 17. Adjusting groove 16 is included on the rotatable mounting base 11. Locking bolt 17 is installed inside adjusting groove 16 to lock the rotatable mounting base 11 on the fixed locking base 12. After stud feet 194 underneath the apparatus to be mounted are shifted into the locking portion 152 of mounting holes 15 on the fixed locking base 12, locking bolt 17 is turned clockwise to lock down the rotatable mounting base 11 on the fixed locking base 12. The apparatus is then securely locked on RAM 1. When dismounting the apparatus, first turn locking bolt 17 counterclockwise. Dial rotatable mounting base 11 back to insertion portions 152. The apparatus is ready to be dismounted from RAM 1. There is also a lever 19 on the rotatable mounting base 11 for the ease of dialing rotatable mounting base 11.

In another embodiment, the gourd-shaped mounting holes 15 comprise insertion groove and a U-shaped hole. Insertion groove is used as insertion portion 151. U-shaped hole is used as locking portion 152. When mounting an apparatus, stud feet 194 are inserted through the round mounting holes 14 into the insertion groove. Then the rotatable mounting base 11 is turned to carry stud feet 194 into the U-shaped holes. The apparatus is thus mounted rapidly and safely on RAM 1.

In another embodiment, the fixed locking base 12 of RAM 1 is mounted on the apparatus mount adaptor 38.

In another embodiment, the fixed locking base 12 of RAM 1 is mounted on a suitable surface using appropriate mounting method. An apparatus is mounted quickly on RAM 1 before use. The apparatus is dismounted quickly for storage after use.

Figure 21:
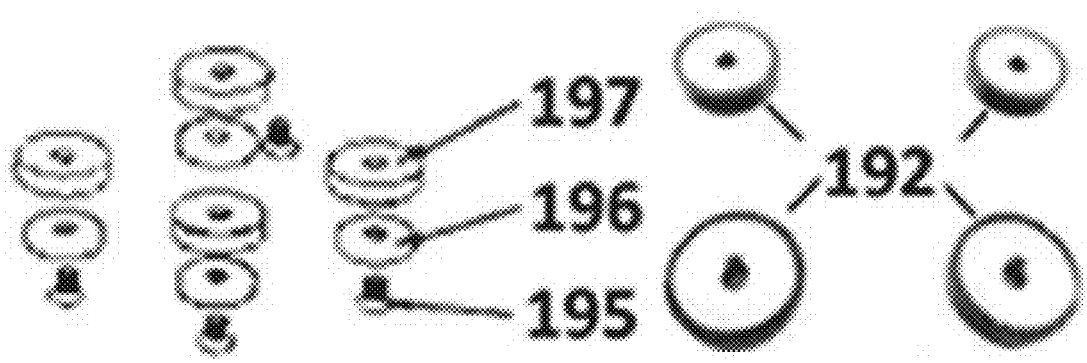
FIG. 21 shows a schematic view of the parts of magnetic mount device 192 for a RAM 1 in one embodiment of this invention.
Figure 22:
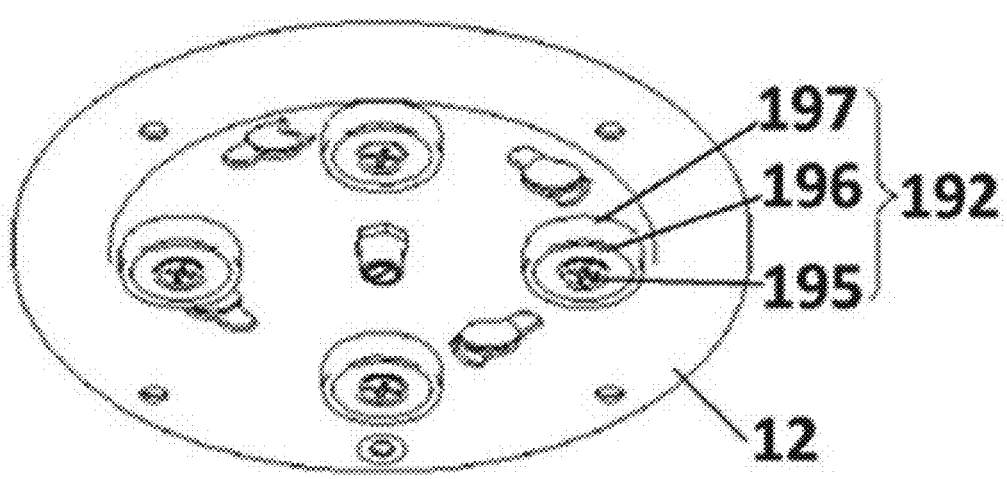
FIG. 22 shows a schematic bottom view of a RAM 1 using magnetic mount device 192 in one embodiment of this invention.
Figure 23:
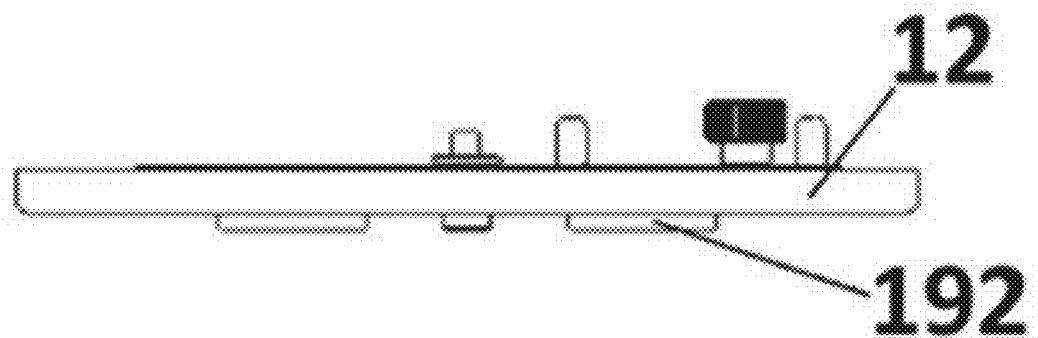
FIG. 23 shows a schematic elevation view of a RAM 1 using magnetic mount device 192 in one embodiment of this invention.

In another embodiment as shown in FIG. 21 to FIG. 23, RAM 1 is used magnetically. A magnetic mount device 192 includes a soft plastic protector cup 197, a magnet 196 and a countersunk head screw 195. Magnet 196 is sleeved inside the protector cup 197. Both protector cup 197 and magnet 196 have an aligned hole in the center. Countersunk head screw 195 passes through the holes in magnet 196 and protector cup 197 and into corresponding installation holes underneath the fixed locking base 12. Countersunk head screw 195 is tightened to install the magnetic mount device 192 underneath the fixed locking base 12. An apparatus can be mounted and left on RAM 1. When use, only a ferrous surface is needed to allow magnets 196 to attract to. For instance, this ferrous surface could be the ferrous mounting plate installed on top of the multipod or the roof of an automobile. The apparatus can be mounted and used instantly. After use, the whole set of apparatus with RAM 1 can be dismounted quickly for storage.

In one embodiment, this invention provides an extendable multipod for mounting an apparatus, comprising: a) an apparatus mount 1 that allows rapid mounting and dismounting of an apparatus, wherein said apparatus mount 1 is attached to one end of an extendable device 2; b) an extendable device 2 comprising a plurality of tubular poles which are mounted so as to be telescopically and axially slidable relative to each other between an extended position and a retracted position, said extendable device 2 is attached to a supporting element 3; and c) a supporting element 3 comprising a plurality of legs 31 that are connected to a divaricating plate 33, wherein said extendable device 2 is inserted through the divaricating plate 33 to affix on a leg connector 34, said leg connector 34 is connected to said plurality of legs 31 by a plurality of braces 32.

In one embodiment, said extendable multipod further comprises one or more power supplies 37 that are hidden inside said plurality of legs 31 or inside said extendable device 2. In another embodiment, said power supplies 37 are rechargeable batteries, single use dry batteries, or single use hydrogen cells.

In one embodiment, said extendable multipod further comprises a power supply control installed inside said divaricating plate 33. In another embodiment, said power supply control comprises a charging socket 382 that allows charging of said power supplies 37 and a discharging socket 381 that provides power to apparatus mounted on said apparatus mount 1.

In one embodiment, said extendable device 2 comprises one or more pole locks 23, each of said pole lock 23 separately sleeves and moves freely along a first pole 211 sleeved by a second pole 212 with larger diameter, wherein after the first pole 211 is raised or lowered to a desirable height in relation to the second pole 212, said first pole 211 will be locked in position when said pole lock 23 is positioned to sleeve said second pole 212.

In one embodiment, said extendable device 2 comprises a motorized device which is wired or wirelessly remote controlled or switch controlled.

In one embodiment, supporting element 3 comprises two or more legs 31. In another embodiment, said multipod supporting element 3 comprises three or four legs 31.

In one embodiment, at least one of said legs 31 has a hinged foot 39 at near the bottom of the legs 31, said hinged foot 39 can be folded up for stand-by or folded down to be pinned into ground.

In one embodiment, at least one of said legs 31 has one or more hinged caster 40 to facilitate moving of said extendable multipod.

In one embodiment, said supporting element 3 has a foldable arm 43 attached to said extendable device 2, and the said foldable arm 43 comprises a basket or a working platform 42 attached at an end of said foldable arm 43 and said foldable arm 43 can be folded up for stand-by or folded down to be used as temporary storage or working platform 42. The foldable arm 43 with a basket is used for storing additional equipment and the working platform 42 is used for placing subjects atop during operations. Said foldable arm 43 is attached to the side of said supporting element 3 and can be folded up for storage or folded down for operations.

In one embodiment, said extendable device 2 comprises a motorized device. In another embodiment, said motorized device comprises a drive screw 28, an extension control motor 25 and extension control switches 27.

In one embodiment, said motorized device is controlled by wired or wireless remote control.

In one embodiment, said apparatus mount 1 comprises a fixed locking base 12 and a rotatable mounting base 11 wherein a) said rotatable mounting base 11 has a rotatable connection with said fixed locking base 12 through a rotation axle and comprises one or more first mounting holes 14 for connecting with one or more stud feet 194 attached to the apparatus to be mounted; and b) said fixed locking base 12 comprises a set of second mounting holes 15 complementary and concentric to said first mounting holes, wherein each of said second mounting holes 15 has a locking portion 152 and an insertion portion 151, wherein said stud feet 194 from the apparatus is inserted through said first mounting holes 14 to enter the insertion portion 151 of said second mounting holes 15, wherein rotation of said rotatable mounting base 11 will move said stud feet 194 into the locking portion 152 of said second mounting holes 15 to lock said apparatus into position.

In one embodiment, said second mounting holes 15 on said fixed locking base 12 are gourd-shaped holes having a side with a larger diameter and a side with a smaller diameter, wherein the side having a larger diameter is the insertion portion 151 and the side with smaller diameter is the locking portion 152.

In one embodiment, said second mounting holes 15 on said fixed locking base 12 comprises an insertion groove and a U-shaped hole, wherein said insertion groove is the insertion portion and said U-shaped hole is the locking portion.

In one embodiment, said apparatus mount 1 comprises a locking device between said rotatable mounting base 11 and fixed locking base 12, said locking device comprises an adjustment groove 16 on said rotatable mounting base 11 and a locking bolt 17 inside said adjustment groove 16, wherein tightening of said locking bolt 17 will lock down said rotatable mounting base 11 on said fixed locking base 12.

In one embodiment, said rotatable mounting base 11 comprises a lever 19 for turning said rotatable mounting base 11.

In one embodiment, said fixed locking base 12 further comprises a mount adaptor 38. In another embodiment, said mount adaptor 38 comprises a connection plate and a countersunk head screw 195; said mount adaptor 38 is affixed underneath said fixed locking base 12 through the use of said countersunk head screw 195. In a further embodiment, mount adaptor 38 comprises one or more magnetic mount devices 192; each of said magnetic mount device 192 comprises one protection cup 197, one magnet 196 and one countersunk head screw 195, wherein said magnet 196 and said protection cup 197 have concentric and aligned holes in the center and said magnet 196 is sleeved inside said protection cup 197, said countersunk head screw 195 passes through said holes in the center of said magnet 196 and said protection cup 197 to affix them to said fixed locking base 12.

REFERENCES

1. U.S. Pat. No. 6,454,228 B1, Bosnakovic (2002).
2. U.S. Pat. No. 6,902,294 B2, Wright (2005).
3. US 2012/0181979 Hudspeth, et al. (2012).

What is claimed is:

1. An extendable multipod for mounting an apparatus, comprising:
   a. an apparatus mount (1) that allows rapid mounting and dismounting of the apparatus, wherein said apparatus mount (1) is attached to one end of an extendable device (2);
   b. the extendable device (2) comprising a plurality of tubular poles which are mounted so as to be telescopically and axially slidable relative to each other between an extended position and a retracted position, said extendable device (2) is attached to a supporting element (3);
   c. the supporting element (3) comprising a plurality of legs (31) that are connected to a divaricating plate (33), wherein said extendable device (2) is inserted through the divaricating plate (33) to affix on a leg connector (34), said leg connector (34) is connected to said plurality of legs (31) by a plurality of braces (32); and
   d. one or more power supplies (37) that are hidden inside said plurality of legs (31) or inside said extendable device (2), and a power supply control installed inside said divaricating plate (33), wherein said power supply control comprises a charging socket (382) that allows charging of said power supplies (37) and a discharging socket (381) that provides power to the apparatus mounted on said apparatus mount (1).

2. The extendable multipod of claim 1, wherein said power supplies (37) are rechargeable batteries, single use dry batteries, or single use hydrogen cells.

3. The extendable multipod of claim 1, wherein said extendable device (2) comprises one or more pole locks (23), each of said pole lock (23) separately sleeves and moves freely along a first pole (211) sleeved by a second pole (212) with larger diameter, wherein after the first pole (211) is raised or lowered to a desirable height in relation to the second pole (212), said first pole (211) will be locked in position when said pole lock (23) is positioned to sleeve said second pole (212).

4. The extendable multipod of claim 1, wherein said extendable device (2) comprises a motorized device, said motorized device is wired or wirelessly remote controlled or switch controlled.

5. The extendable multipod of claim 1, wherein said supporting element (3) comprises two or more legs (31).

6. The extendable multipod of claim 1, wherein at least one of said legs (31) has a hinged foot (39) at its bottom, said hinged foot (39) can be folded up for stand-by or folded down to be pinned into ground.

7. The extendable multipod of claim 1, wherein at least one of said legs (31) has one or more hinged caster (40) to facilitate moving of said extendable multipod.

8. An extendable multipod for mounting an apparatus, comprising:
   a. an apparatus mount (1) that allows rapid mounting and dismounting of the apparatus, wherein said apparatus mount (1) is attached to one end of an extendable device (2);
   b. the extendable device (2) comprising a plurality of tubular poles which are mounted so as to be telescopically and axially slidable relative to each other between an extended position and a retracted position, said extendable device (2) is attached to a supporting element (3); and
   c. the supporting element (3) comprising a plurality of legs (31) that are connected to a divaricating plate (33), wherein said extendable device (2) is inserted through the divaricating plate (33) to affix on a leg connector (34), said leg connector (34) is connected to said plurality of legs (31) by a plurality of braces (32), further comprises a foldable arm (43) attached to said extendable device (2), wherein said foldable arm (43) comprises a basket or a working platform (42) attached at an end of said foldable arm (43) and said foldable arm (43) can be folded up for stand-by or folded down to be used as temporary storage or working platform (42).

9. An extendable multipod for mounting an apparatus, comprising:
   a. an apparatus mount (1) that allows rapid mounting and dismounting of the apparatus, wherein said apparatus mount (1) is attached to one end of an extendable device (2);
   b. the extendable device (2) comprising a plurality of tubular poles which are mounted so as to be telescopically and axially slidable relative to each other between an extended position and a retracted position, said extendable device (2) is attached to a supporting element (3); and
   c. the supporting element (3) comprising a plurality of legs (31) that are connected to a divaricating plate (33), wherein said extendable device (2) is inserted through the divaricating plate (33) to affix on a leg connector (34), said leg connector (34) is connected to said plurality of legs (31) by a plurality of braces (32), wherein said apparatus mount (1) comprises a fixed locking base (12) and a rotatable mounting base (11), wherein
      a. said rotatable mounting base (11) has a rotatable connection with said fixed locking base (12) through a rotation axle and comprises one or more first mounting holes (14) for connecting with one or more stud feet (194) attached to the apparatus to be mounted; and
      b. said fixed locking base (12) comprises a set of second mounting holes (15) complementary and concentric to said first mounting holes (14), wherein each of said second mounting holes (15) has a locking portion (152) and an insertion portion (151),
   wherein said stud feet (194) from the apparatus is inserted through said first mounting holes (14) to enter the insertion portion (151) of said second mounting holes (15), wherein rotation of said rotatable mounting base (11) will move said stud feet (194) into the locking portion (152) of said second mounting holes (15) to lock said apparatus into position.

10. The extendable multipod of claim 9, wherein said second mounting holes (15) on said fixed locking base (12) are gourd-shaped holes having a side with a larger diameter and a side with a smaller diameter, wherein the side having a larger diameter is the insertion portion (151) and the side with smaller diameter is the locking portion (152).

11. The extendable multipod of claim 9, wherein said second mounting holes on said fixed locking base (12) comprises an insertion groove and a U-shaped hole, wherein said insertion groove is the insertion portion and said U-shaped hole is the locking portion.

12. The extendable multipod of claim 9, wherein said apparatus mount (1) comprises a locking device between said rotatable mounting base (11) and fixed locking base (12), said locking device comprises an adjustment groove (16) on said rotatable mounting base (11) and a locking bolt (17) inside said adjustment groove (16), wherein tightening of said locking bolt (17) will lock down said rotatable mounting base (11) on said fixed locking base (12).

13. The extendable multipod of claim 9, wherein said rotatable mounting base (11) comprises a lever (19) for turning said rotatable mounting base (11).

14. The extendable multipod of claim 9, wherein said fixed locking base (12) further comprises a mount adaptor (38).

15. The extendable multipod of claim 14, wherein said mount adaptor (38) comprises a connection plate and a countersunk head screw (195); said mount adaptor (38) is affixed underneath said fixed locking base (12) through the use of said countersunk head screw (195).

16. The extendable multipod of claim 14, wherein said mount adaptor (38) comprises one or more magnetic mount devices (192); each of said magnetic mount device (192) comprises one protection cup (197), one magnet (196) and one countersunk head screw (195), wherein said magnet (196) and said protection cup (197) have concentric and aligned holes in the center and said magnet (196) is sleeved inside said protection cup (197), said countersunk head screw (195) passes through said holes in the center of said magnet (196) and said protection cup (197) to affix them to said fixed locking base (12).

* * * * *